United States Patent [19]

Biebuyck et al.

[11] Patent Number: 6,096,386
[45] Date of Patent: Aug. 1, 2000

[54] METHOD OF ORIENTED DEPOSITING CHEMICALLY DEFINED BODIES

[75] Inventors: Hans Biebuyck, Adliswil; Emmanuel Delamarche, Zurich; Bruno Michel, Adliswil, all of Switzerland

[73] Assignee: International Business Machines Corporation, Armonk, N.Y.

[21] Appl. No.: 09/068,053
[22] PCT Filed: Sep. 6, 1996
[86] PCT No.: PCT/IB96/00908
§ 371 Date: Apr. 29, 1998
§ 102(e) Date: Apr. 29, 1998
[87] PCT Pub. No.: WO98/09735
PCT Pub. Date: Mar. 12, 1998
[51] Int. Cl.[7] .................................................. C08J 7/04
[52] U.S. Cl. .................. 427/510; 427/261; 427/407.1; 427/511; 427/558; 427/559; 427/595
[58] Field of Search .................................. 427/510, 511, 427/558, 559, 595, 261, 407.1

[56] References Cited

U.S. PATENT DOCUMENTS 5,512,131 4/1996 Kumar et al. ........................ 156/655.1

FOREIGN PATENT DOCUMENTS

WO 96/07487 3/1996 WIPO .
WO 96/29629 9/1996 WIPO .
WO 97/07429 2/1997 WIPO .

OTHER PUBLICATIONS

Kim et al. "Combining Patterned Self–Assembled Monolayers of Alkanethiolates on Gold With Anisotropic etching of Silicon to Generate Controlled Surface Morphologies", J. Electrochem Soc. vol. 142, No. 2, Feb. 1995, pp. 628–633.

"Scenes From a Marriage–of Optics and Electronics", Science, vol. 268, Jun. 23, 1995, pp. 1702–1703.

*Primary Examiner*—Bernard Pianalto
*Attorney, Agent, or Firm*—Steven Capella

[57] ABSTRACT

A method is proposed with which chemically defined bodies can be deposited on a substrate. Therefor, the bodies are fixed with a predetermined orientation on a stamping means which is then approached to the substrate whereby the bodies are deposited. While releasing the stamping means the bodies remain on the substrate keeping their orientation.

13 Claims, 4 Drawing Sheets

METHOD OF ORIENTED DEPOSITING CHEMICALLY DEFINED BODIES

TECHNICAL FIELD

The invention is related to a method of depositing chemically defined bodies on a substrate surface. The bodies have at least partially a predetermined chemical composition and may comprise molecules, macromolecules or also nanostructures composed of molecules or macromolecules.

BACKGROUND OF THE INVENTION

In the article "Scenes From a Marriage—Of Optics and Electronics" by Robert F. Service in Science, Vol. 268, Jun. 23, 1995, a method is described which is called fluidic self-assembly. Therein small optical components, such as lasers are mixed with a fluid, such as ethanol and are poured over a silicon wafer which comprises holes matching the shape of the lasers. Bit by bit the lasers settle into the holes under the influence of gravity. When a laser goes in a hole properly it stays there because it is effectively removed from the shear forces associated with the movement of the liquid that otherwise would carry the lasers away. By this method no alignment is needed to help the lasers go where they shall be located. However, no additional specific force guides the lasers to their destination.

The article "Direct Measurement of the Forces Between Complementary Strands of DNA" by Lee, Chrisey and Colton in Science, Vol. 266, Nov. 4, 1994, is related to interaction forces between single strands of DNA. Therefor, two surfaces covered with DNA strands are brought in near vicinity until the attractive forces of the strands effect a chemical binding such that the surfaces are held together by a specific force.

In "Immobilization of Antibodies on a Photoactive Self-Assembled Monolayer on Gold" by Delamarche et al. in Langmuir, Vol. 12, Nr. 8, pp. 1997–2006, Jan. 4, 1996 a strategy for immobilizing biomolecules on a photoactivable surface is discussed. Therefor, a gold substrate is functionalized with a dialkyl disulfide which forms a self-assembled monolayer (SAM). Afterwards the reactive ester groups at the termini of the SAM are converted into photoactivable groups based on benzophenone. This photoactivable group acts as a crosslinking agent that is inert under ambient light and is activated by near-UV light. UV irradiation causes biradical formation at the ketyl center of the benzophenone. Thereby, a molecule or macromolecule such as a protein undergoes covalent attachment to the substrate via the SAM. Proteins deposited on a solid substrate find applications e.g. in enzyme-based biosensors and in forming biocompatible surfaces.

Microcontact printing is the subject of the article "Patterning Self-Assembled Monolayers: Applications in Materials Science" by Kumar, Biebuyck and Whitesides in Langmuir, Vol. 10, Nr. Feb. 5, 1994, pp. 1498–1511. Polydimethylsiloxane (PDMS) is used as material of a stamp which is patterned by using a lithographic process. The stamp is then provided with alkanethiol serving as "ink" for the following stamping process. By touching a gold substrate surface the protrusions of the pattern transfer thiol onto the substrate where it forms a patterned SAM. The molecules in these SAMs are arranged in ordered crystalline domains on the surface of the substrate having one of their ends attached covalently to this surface and the other end extending upright, away from the substrate. Thus, the new surface of a substrate printed upon with thiol has interfacial properties characteristic of one end of the molecules of the SAM. This SAM can be used in a following step as a mask for an etching step such that the pattern is transferred into the surface of the substrate. The alkanethiol molecules are not oriented on the stamp with this procedure.

Further known is a method called the Langmuir-Blodgett process. Information about this process may be derived from A. Ulman's "An Introduction to Ultrathin Films", Academic Press, San Diego, Calif., 1991. This method of thin-film formation organizes molecules at an air-water interface (Langmuir film). Organization results from progressively greater lateral confinement of the molecules at the air-water interface by use of a moveable mechanical barrier to sweep them together. The molecules undergo a disorder-order transition at sufficiently high confinement that affects the organization of the molecules in two-dimensional crystals with a homogeneous in-plane composition and an asymmetric out-of-plane distribution having one end of the molecule rigorously disposed at the air interface and the other remaining immersed in the water. Moving a substrate through such an air-water interface having a Langmuir film transfers it to the substrate (Langmuir-Blodgett process). Although the molecules in the Langmuir-Blodgett film remain organized they are not covalently attached to the substrate a priori as is the case for the formation of SAMs. Because of this lack of covalent linkage Langmuir-Blodgett films are fragile. No method is known which may be used to pattern such a film while preserving its viability.

In "Light-directed, spatially addressable parallel chemical synthesis" by Foder et al. in Science, Vol 251, p. 767, Feb. 15, 1991, solid phase chemistry, photolabile protecting groups and photolithography have been combined to achieve light-directed spatially addressable parallel chemical synthesis to yield a highly diverse set of chemical products.

In "Guide to protein purification", by Murray P. Deutscher, Academic Press, Vol. 182 is given an introduction into affinity chromatography. Affinity chromatography is a technique by which ligands or receptors are purified. Typically, a solid substrate having a high surface area is derivatized on its surface with either the ligand or the receptor. A mobile phase, usually liquid, is moved over the solid substrate. This liquid contains the complement of the liquid or receptor, often in a matrix comprising many other types that do not form the complementary ligand-receptor complex. Thus, as the flow occurs, those molecules undergoing ligand-receptor complexation proceed slower than other molecules that have not such binding possibility. As a consequence of this retardation in the movement of molecules forming complexes, a separation is affected that concentrates increasingly those molecules forming the complexes. These methods are general and used extensively in the purification of small and large molecules known in the chemical and biochemical fields.

Providing colloidal particles of gold with DNA strands and their assembling via linking duplexes is reported on in "A DNA-based method for rationally assembling nanoparticles into macroscopic materials" by Chad et al in Nature, Vol 382, Aug. 15, 1996, pages 607–609. However, no ordered assembly is achieved. On pages 609–611 of the same journal the article "Organisation of 'nanocrystal molecules' using DNA" deals with the use of long DNA linking duplexes for an ordered assembly of nanocrystal molecules.

OBJECT AND ADVANTAGES OF THE INVENTION

It is an object of the invention to provide a method of depositing chemically defined bodies on a surface of a substrate. It is a further object of the invention to provide a deposition method which allows controlled deposition of chemically defined bodies, like molecules, macromolecules and/or nanostructures. As chemically defined body shall be understood any subject which consists of one or more molecules which have a chemical composition which is at least partially known at the external region of the body. This constitutes in the fact that the proposed method shall be applicable on those bodies which have a chemically determinable orientation, as is the case with many molecules or macromolecules or materials or components derivatized on their surface to have a useful chemical asymmetry. The bodies may also be called nanoscale devices or nanoparticles.

The invention with the features of claim 1 shows the advantage that the stamping means allows a plurality of bodies to be transferred in parallel onto a substrate. Especially for bodies having an anisotropic functionality orientation is useable to control its functionality. Such functionality can be of chemical type or even a physical type, e.g. the emission area of a laser. This splits up the manufacturing process of the assembly comprising substrate and bodies, in that the step of orienting the bodies is restricted to the stamping means. By that the orientation of the bodies needs not be done on the substrate which on one hand reduces the probability of damage, poor function and/or other detriment, e.g. due to non-oriented bodies, and on the other hand allows the use of a substrate without alignment structures. Furthermore, by controlled positioning of the stamping means a patterned transfer of the bodies is possible without needing to provide the substrate with a pattern, e.g. by a separate step like photolithography, when the stamp is formed with a predetermined outline and/or the stamp is positioned over a selected portion of the substrate. The stamping means is also best suited for repetitive use which makes the method very economic.

To this adds the advantage that with the invented method components can be assembled after they have been manufactured separately. This again is extremely useful for components that can not even be fabricated together, for example when the environmental conditions of manufacturing steps for one component damage the other one. With the new method such components may be manufactured each with optimal conditions by manufacturing them separately and bringing them together and joining them afterwards with the invented process. Further such components may be tested separately which increases the yield of viable assemblies. Another consequence is the fact that it takes shorter time to finish an assembly which leads to shorter time until final testing can unveil eventual errors, such as design or procedural errors. Thereby, the time lag between influence and awareness of an error is reduced which means that the time during which an error remains undetected and causes non-working assemblies is reduced which again increases the yield. Finally, an assembly of different components is much more flexible than a process which incorporates the manufacturing of the whole assembly in one. The bodies are attached to the surface of the substrate at a site opposite to the site where it is held by the stamping means. By this the orientation of the body is guaranteed such that the functionality of the body is present as needed. By this the exposure of the body to the substrate surface and the arising functionality is maximized.

The measures proposed in the subclaims 2 to 13 represent further embodiments and improvements of the method of claim 1.

To provide the bodies within a fluid has the advantageous effect that the bodies by virtue of natural (Brownian diffusion of molecules) movement or aided by the addition of induced movement reach every point easier on the stamping means which accelerates the process of attaching the bodies to the stamping means.

By patterning the stamping means, the method becomes even more flexible since by that arbitrarily complex patterns of bodies on a substrate are achievable. No conventional patterning techniques are needed. The pattern created does not suffer from restrictions as exhibits the nature of light on lithographic patterning processes such as those due to inherent limitations of wavelength or because of the processing procedures typical of lithography. Additionally, the stamping means can be reused a lot of times for creating the same pattern without need of e.g. a separate lithographic process for each patterning step. Parallel and homogeneous transfer of oriented bodies can be achieved in a spatially direct manner.

Using light as a means for assisting in the chemical binding reaction is a very useful method because by this the components which are supposed to undergo binding reaction with each other may be aligned even when they are already in contact with each other without risking disruption of their structure respectively risking to tear them away from their position. When alignment is achieved the light can be switched on to activate the surface and to fix the bodies.

Using attachment means on the substrate is helpful for increasing the force that keeps the bodies in their position and their orientation. Thus, errors due to a change in position and/or orientation of the bodies are minimized. Depending on its material, an attachment means can be chosen which attaches the bodies regardless of their nature which is a very general property.

The exploitation of the chemical definition of the bodies in that they are chemically attracted to an orientation means which then automatically performs the orientation offers the advantage that without any active alignment process and without any mechanical alignment structure chemically defined bodies such as molecules, macromolecules or nanostructures can be deposited on a substrate with a predetermined orientation.

An advantage of the above method in combination with an orientation means that attracts a specific selection of body types is that then the process of attracting the bodies and orienting them is selective which means that only molecules with the predetermined chemical behavior are attached to the stamping means. Additionally, since the selection of the body types occurs by their specific affinity, denatured and/or otherwise inactive bodies can be eliminated prior to the printing of the bodies onto the substrate.

The above method is even more advantageous if at the same time different selections of body types can be deposited on the substrate with only one stamping means. A relatively complex assembly of substrate and bodies can be manufactured in that way. When the stamp has regions with different affinities for the different bodies this allows each type of body to assemble simultaneously on the stamp in its designated area and then to be printed in one common printing step.

Using an assistant fluid which comprises a material which substitutes the orientation means at the bodies brings in the advantage that by this the step of releasing the stamping means from the substrate surface is facilitated because the attractive forces between the orientation means and the bodies is weakened in that the material occupies the place of the orientation means at the bodies and thereby directs this attractive force to itself This also is helpful to decrease the risk of damaging the orientation means and/or the bodies or to change their position and/or their orientation.

When the stamping means comprises an activated surface which serves to effect a self assembly of the orientation means one has a bigger variety of choice of materials for the stamping means and for the orientation means. Particularly for PDMS such an activated surface is very useful to achieve self-assembly of alkylamines, alkylsilanes or other molecules on its surface. The inherent reactivity of the surface of the activated stamping means and the orientation means causes the correct placement of the latter on the stamp which is then further used to orient the bodies on the stamp.

SUMMARY OF THE INVENTION

A method is proposed which takes advantage of the microcontact printing area. Therefrom it is already known to deposit a chemical material on a substrate by covering the surface of a patterned flexible stamp with the material and by touching the surface of the substrate whereby the material is transferred in form of the stamp's pattern. The invention uses a stamp for depositing a material on the substrate with a predetermined orientation. Therefor the material is already oriented on the stamp. The orientation on the stamp effects that the material is determined to come into a particular orientation to the substrate while it is transferred. The predetermined orientation is useful to achieve a predetermined functionality of the material. The substrate may be covered with a layer that serves to attract the material which after removal of the stamp hence remains on the substrate.

DESCRIPTION OF THE DRAWINGS

Examples of the invention are depicted in the drawings and described in detail below by way of example. It is shown in FIG. 1. a stamping means dipping into a container fluid with chemically defined bodies, FIG. 2. the stamping means of FIG. 1 being in contact with a substrate, FIG. 3. the stamping means from FIG. 2 being released from the substrate, FIG. 4. the substrate from FIG. 3 with the chemically defined bodies on it.

All the figures are for sake of clarity not shown in real dimensions, nor are the relations between the dimensions shown in a realistic scale.

DETAILED DESCRIPTION OF THE INVENTION

In the following the various exemplary embodiments of the invention are described. The numbering of all figures is consistent such that identical elements are always referred to with identical numbers.

Figure 1:
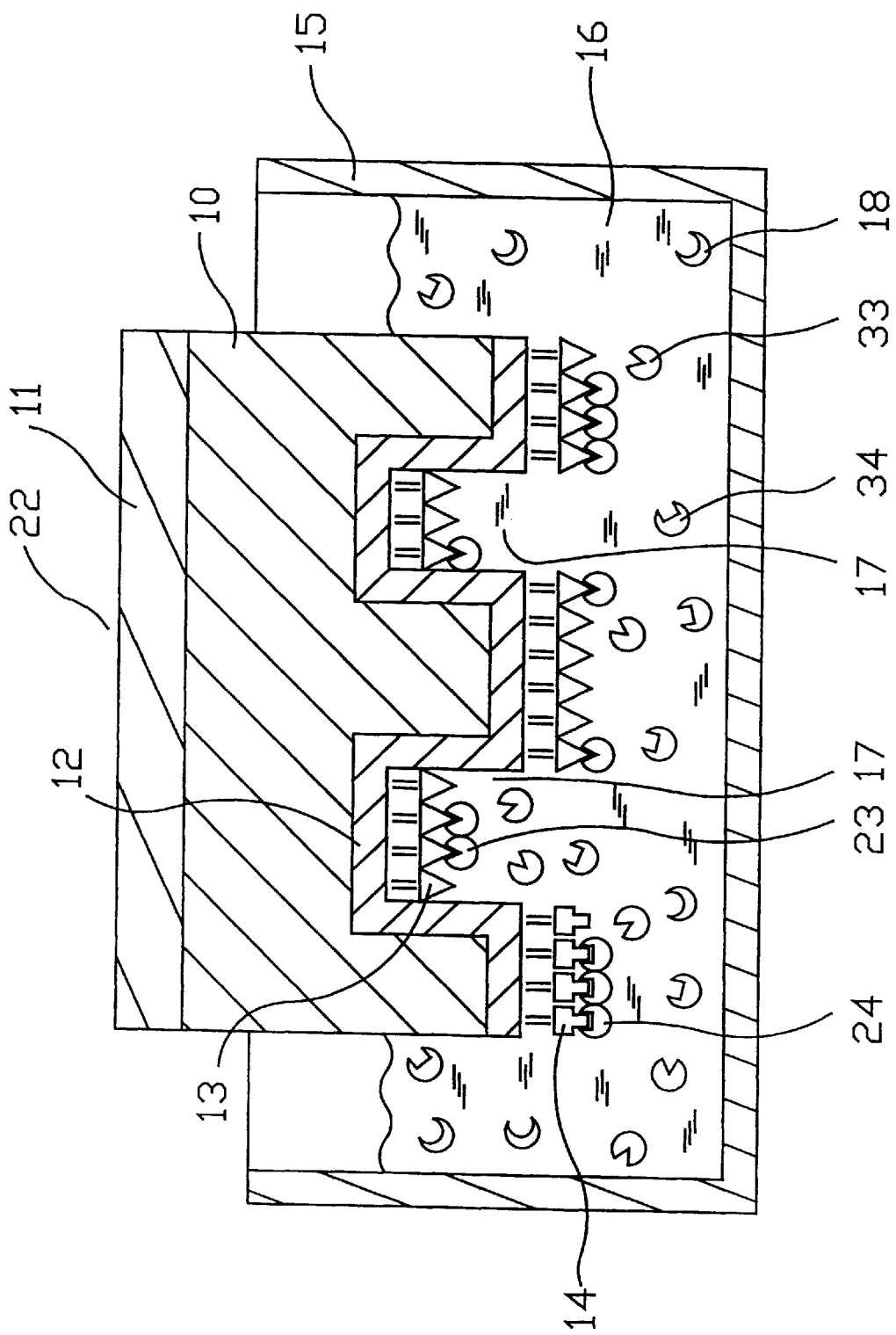

In FIG. 1 a stamping means 22 comprises a stiff backplane 11 on which a stamping layer 10 is attached. The stamping layer 10 is patterned at its underside, i.e. it comprises several depressions 17. The patterned surface of the stamping layer 10 comprises an activated surface 12 which modifies the chemical behavior of the stamping layer 10 near its surface. The activated surface 12 is covered with two different types of orientation means 13, 14 which implies that there are areas with a first type of orientation means 13 and regions with a second type of orientation means 14. The stamping means 22 is positioned partly inside a basin 15 which contains a container fluid 16 in which several types of chemically defined bodies 18, 33, 34 are included. In this specific example a first free type of body 33, a second free type of body 34 and a third free type of body 18 are present. Some of the first type free bodies 33 are changed into first type fixed bodies 23 in that they are bound to the first type orientation means 13. Also some of the second type free bodies 34 are changed into first type fixed bodies 24 in that they are chemically bound to the second type orientation means 14.

As stamping layer a stiff material, a flexible material or also any combination of them is possible. A flexible component increases the quality of the method since better contact with the substrate may be achieved, particularly for rough or nonplanar surfaces to be deposited upon. This type of material also makes the method less prone to errors induced by contamination of that surface. The resilient or flexible stamping layer 10 may e.g. be made of polydimethylsiloxane (PDMS) which is a flexible, elastomeric and transparent material. Anyhow, any polymer like other siloxanes, or more generally any flexible material, but as well composite materials combining brittle and elastomeric types are suitable for the stamping layer 10. The pattern on the stamping means 22 may be produced by a lithographic process, E-beam lithography, embossing, molding features into the surface or even microcontact printing. Thereby, very small scales are achievable. The activated surface 12 of the stamping layer 10 makes it chemically attractive to the material of the orientation means 13, 14. Exemplarily for a siloxane, ozone in a reactive chamber or an oxidizing acid mixture in solution may be used as an activation means with which the stamping layer 10 is pretreated. This leads to a self-assembly of the orientation means 13, 14 when it is manufactured. It hence forms a self-assembled monolayer, e.g. when an alkylsilane or alkylamine is used. The step of preparing the stamping means 22 by covering it with the orientation means 13, 14 is also called derivatization. This monolayer is. characterized in that its molecules are oriented in a predetermined direction through chemical reaction with the activated surface 12. This is used for the attachment of the next layer, namely the layer of chemically defined, fixed bodies 23, 24. The molecules of the orientation means 13, 14 serve as ligands which are chemically attractive to specific receptors like a specific key that only fits into a specific lock. The ligand molecules, respectively orientation means 13, 14 need not be oriented themselves as long as they are smaller than the fixed bodies 23, 24 since there will then exist allways a large enough subset of ligand molecules having the desired orientation and hence maximizing the interaction towards the free bodies 33, 34, which allows binding of the free bodies 33, 34 to form the oriented, fixed bodies 23, 24.

The chemical pattern, i.e. the pattern of the different types of orientation means 13, 14 may for instance be the result of a masked patterning process, but generally many other patterning processes are suitable for this. When the stamping means 22 is dipped into the container fluid 16, the chemical attractivity of the orientation means 13, 14 effects an attraction of the free bodies 33, 34, which comprise the receptors; and their assembly as fixed bodies 23, 24, thereby forming a ligand-receptor complex. This also implies that the chemical attractivity of the orientation means 13, 14 is selective to a specific selection of the free bodies 33, 34. Here, the first type orientation means 13 attracts only the first type free bodies 33 and the second type orientation means 14 attracts only the second type free bodies 34. For the third type free bodies 18 no corresponding orientation means is provided, so that these remain in solution. The process may hence also be used to select a free, specific chemically defined type of body out from a solution of several, even unknown, free bodies. This demonstrates another feature of the invention, namely that very low quality requirements are to be demanded for the container fluid 16 because of the effective concentration and purification that occurs in the orienting process. The free bodies 33, 34 which are attracted by the orientation means 23, 24 become fixed in position and in orientation. The binding force between the stamping layer 10, respectively its activated surface 12 is stronger than the force which keeps the fixed bodies 23, 24 in their position.

After the process of attaching the fixed bodies 23, 24, which may be assisted thermally and/or by moving the stamping means 22 relatively to the container fluid 16 or vice versa, the stamping means 22 is removed from its contact with the container fluid 16. It may even be removed from the basin 15. A very interesting material which can be used as the orientation means 13, 14 is DNA. DNA is a material which nowadays is produceable for instance in the form of short-length strands (oligonucleotides) in a very predictable way and which exerts very strong and highly predictable binding forces to a corresponding DNA strand. Thereby, a selectivity towards the free bodies 33, 34, 18 is obtainable. The free bodies 33, 34, 18 may themselves be strands of DNA, or even comprise a DNA strand as attaching assistant. Thus, it is possible to produce small structures as the free bodies 33, 34, 18, such as e.g. small laser components which are themselves not chemically attractive but which are provided with a layer of DNA strands on their backside which then easily gets fixed to the DNA strands in the orientation means 13, 14. However, there exist many other molecules or macromolecules known from biochemistry or chemistry which are also well suited to serve as the ligand/receptor pair. The different types of orientation means 13, 14 may be brought on the surface of the stamping means 22 by any conventional patterning method, like lithography or microcontact printing. Also possible is the use of various different activation means which then have a material-selective affinity towards the different types of orientation means 13, 14. DNA as the orientation means 13, 14 and proteins as the free bodies 33, 34 provide examples of the case where the ligands may be formed on the surface of the stamping means 22 using light to spatially direct chemical reaction and hence produce a patterned layer of ligands. The activation, which adds functional chemical groups to the surface of the stamping means 22 may comprise methods like plasma treatment and/or wet chemical oxidation, e.g. for introducing reactive alcohols, ketones or acids used in conjunction with masks or other agents like microcontainers to affect changes in local reactivity of the surface of the stamping layer 10.

Figure 2:
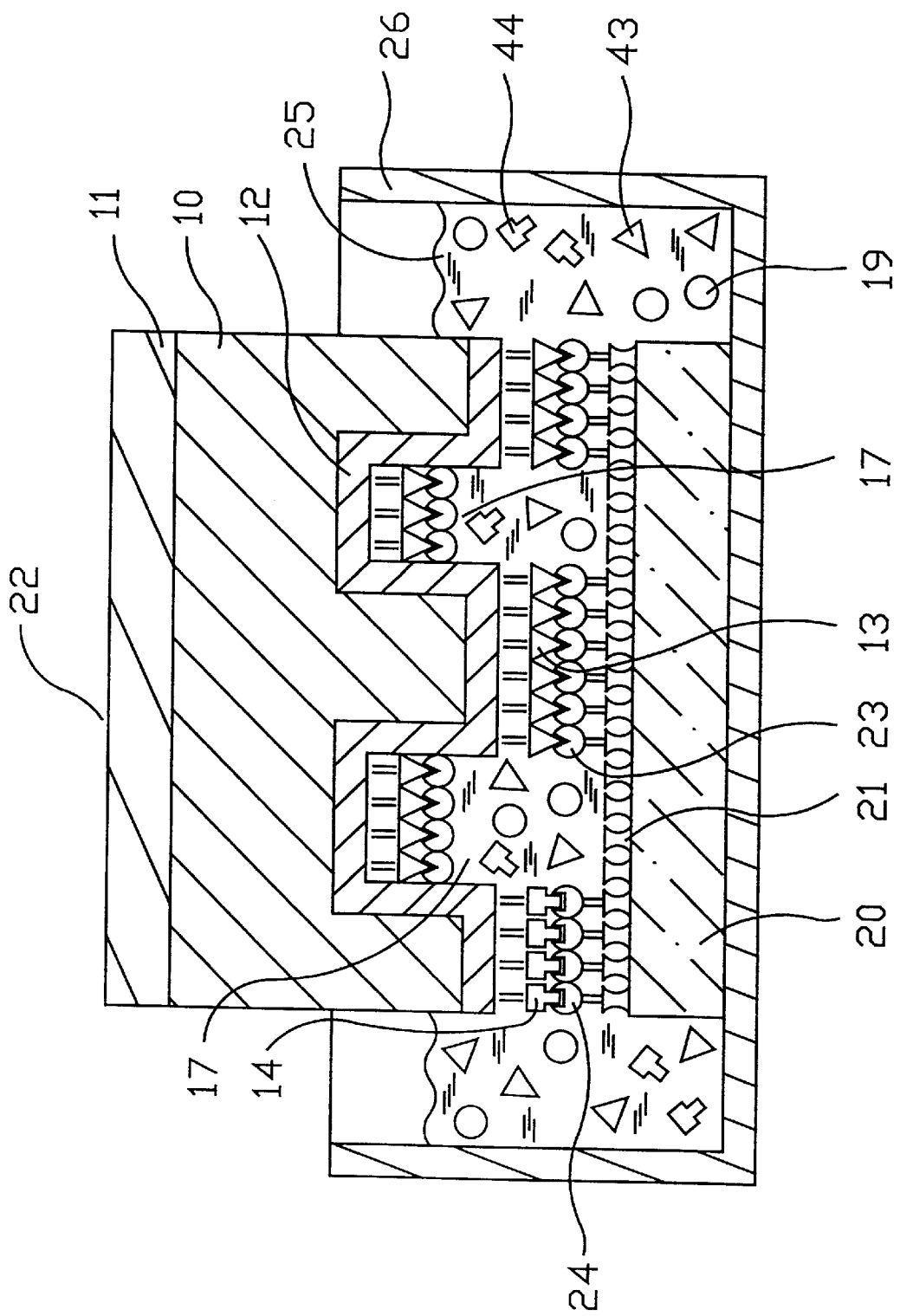

In FIG. 2 a process step is shown where the stamping means 22 is brought into contact with a substrate 20. The substrate 20 is located in a tub 26 which contains an assistant fluid 25. This assistant fluid 25 contains in immersed form several free substituting materials 43, 44, 19, namely a first type free substituting material 43, a second type free substituting material 44 and a third type free substituting material 19. The substrate 20 carries on its upper surface an attachment means 21. The stamping means 22 is laid upon the attachment means 21 such that it comes into contact with the fixed bodies 23, 24 which are not in the depressions 17.

The stamping means 22 is hence brought near the surface of the substrate 20. This may be assisted by some passive or active alignment means such as combinations of protrusions and depressions (on the substrate 20, respectively on the stamping means 22) which during the approaching step slide into each other. The attachment means 21 serves as a sort of glue which chemically attracts in a nonspecific way the fixed bodies 23, 24. This means that the binding force of the attachment means 21 neither exerts any orientational force nor any selective force depending on the chemical structure of the fixed bodies 23, 24. When the fixed bodies 23, 24 come to lay on the attachment means 21 this means exerts a chemical binding force to them which is usually bigger than the force between the orientation means 13, 14 and the fixed bodies 23, 24, thereby allowing the latter to remain on the substrate 20 and the orientation means 13, 14 to remain on the stamping means 22. Arrangements are also possible where the orientation means 13, 14 is released from its stamping means 22 and stays with the fixed bodies 23, 24 on the substrate 20. A removal of the orientation means 13, 14 is then also possible, even a reuse of them.

Figure 3:
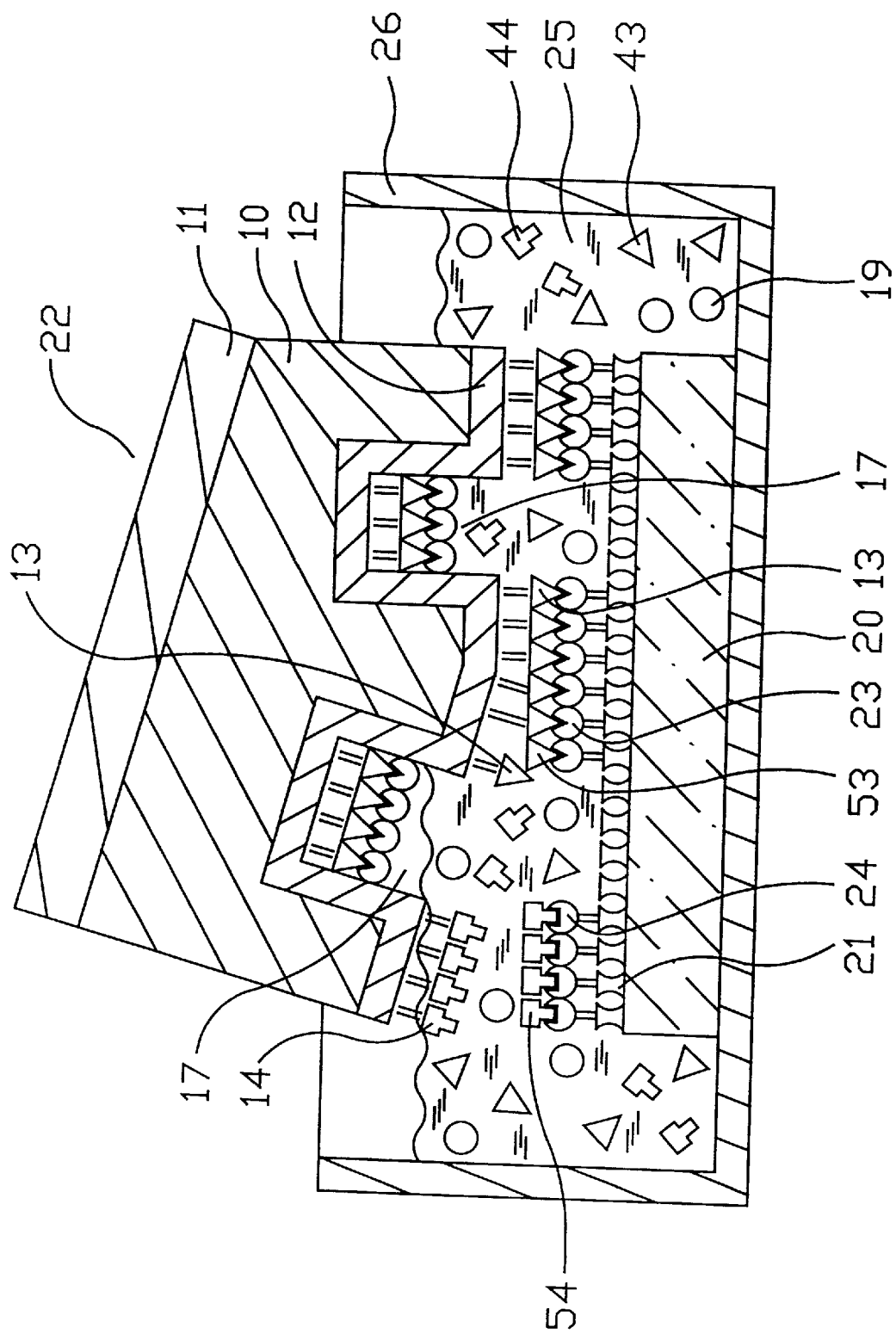

The arrangement in FIG. 3 shows the next process step, namely the one when the stamping means 22 is moved away from the substrate 20. This is here for instance done by lifting the stamping means 22 at one side and removing it slowly from the substrate 20. Thereby a part of the free substituting material 43, 44 is transformed into fixed substituting material 53, 54 when it comes into contact with the fixed bodies 23, 24 which are released from the orientation means 13, 14.

Lifting the stamping means 22 off from the substrate 20 tears apart the connection between the orientation means 13, 14 and the fixed bodies 23, 24. To facilitate this and to avoid ruptures in the resulting structures, this is assisted by the assistant fluid 25 with its immersed substituting material 53, 54, 19. The assistant fluid 25 is also suitable to help maintain the structures of the fixed bodies 23, 24 which otherwise possibly could be damaged due to dehydration or other effects of loss of solvent. These free substituting materials 43, 44, 19 immediately try to substitute the orientation means 13, 14 and transform into the fixed substituting materials 53, 54 where the orientation means 13, 14 is separated from the fixed bodies 23, 24. This substitution process reduces the attractive forces between the orientation means 13, 14 and the fixed bodies 23, 24. After removing the stamping means 22 from the substrate 20 even a new contact between them would not effect binding forces between the fixed bodies 23, 24 and the orientation means 13, 14. The orientation means 13, 14 is hence deactivated by the fixed substituting materials 53, 54.

More general approaches are also possible, e.g. using as the assistant fluid 25 a fluid with high or low ionic strength or pH factor, may generally disrupt the binding connections holding the fixed bodies 23, 24 to the ligands.

Afterwards, the substrate 20 may be taken out from the tub 26 and be e.g. rinsed to wash away the fixed substituting materials 53, 54.

Figure 4:
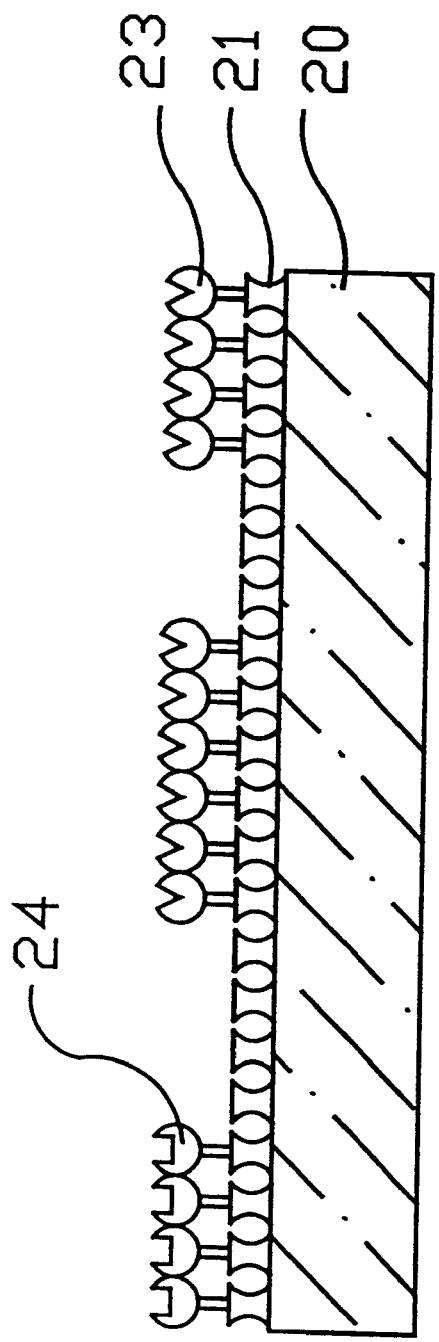

FIG. 4 shows the substrate 20 after the completion of the process. It carries upon its upper surface the attachment means 21 with a pattern of the fixed bodies 23, 24.

The substrate 20 now carries a layer of oriented, fixed bodies 23, 24 upon it. This layer may be used to perform several functions. Since the fixed bodies 23, 24 are fixed in their position they provide an excellent mask for a subsequent etching step because they form very precise borders for the etchant. But even more interesting can be the use of the oriented bodies 23, 24 on the substrate 20 as part of a sensor or actor. Any application which makes use of bodies 23, 24 which have an anisotropic functionality, an which wants to make use of this functionality in a predetermined way is an application which needs the bodies 23, 24 to be supplied in an oriented way such that the direction of the bodies 23, 24 is optimized regarding the functionality. Such applications may make use of the proposed method and its product. It is also possible to perform the method several times sequentially by using the substrate 20 with the oriented bodies 23, 24 as new substrate 20 which is provided with another layer of different or even the same bodies 23, 24. By this, a stacked arrangement containing several layers of different or identical oriented bodies 23, 24 is produceable. The method is especially suitable for bodies 23, 24 which have an anisotropic functionality for a special application but at the same time have at least nearly isotropic sticking properties such that these bodies 23, 24 would not orient themselves on the attachment means 21. The attachment means 21 can on the other hand be chosen disregarding its orienting properties, having e.g. optimal sticking properties concerning the bodies 23, 24 or even having other desired properties since the orienting function needs not be performed by the attachment means 21. This means that there is a bigger choice of materials for the attachment means 21 but also for the bodies 23, 24 while creating a device containing oriented bodies 23, 24. Such choice liberty can be exploited by chosing materials that show e.g. better stability, lesser toxicity, a higher sticking coefficient, any chemical functionality or also a better behavior in certain process conditions. No specially chosen materials for performing orientation need be incorporated into the device to be produced.

An interesting feature can be the use of photoactivation. This means that one or several binding reactions are assisted by light irradiation. A very useful range for the wavelength shall be the UV-range, since then process steps may be done in water and with normal light without risking that already a binding reaction occurs. By illuminating the reaction partners with UV-light then the reaction happens. PDMS is hence very suitable also for this type of reaction because it is transparent to UV-light and can be used in the translucent mode and allows convenient illumination of the orientation means 23, 24, or the attachment means 21.

It is also possible to carry out the invention with a Langmuir-Blodgett arrangement. Such an arrangement comprises e.g. a basin filled with a liquid, such as water. To the liquid's surface the bodies 33, 34 to be deposited, e.g. a material in molecular form, are applied which then automatically spread to form a monomolecular layer. Arranging the stamping means 22 in the water and simply drawing it out of the water when the water is covered with the monolayer, results in a Langmuir-Blodgett film on the surface on the stamping means 22. The water-air interface hence acts as the orientation means 13, 14. This film is characterized in that the molecules are fixed in a plane but not covalently. Thus, an orientation is also obtained. This is a particularly useful method where binding agents for use as orientation means 13, 14 are not known or hard to produce or not or hardly available for any reason.

All fluids mentioned here are to be understood to possibly comprise a liquid and/or a gas. Nevertheless, the orientation means 13, 14 as well as the free chemically defined bodies 23, 24, 18 need not be incorporated in a solvent but can also brought on the stamping means 22 with other media or methods. Generally, also the assistant fluid 25 is not needed. Depending on the material of the stamping layer 20 also an activation at its surface is not obligatory.

Embodiments are also possible which do not even need an orientation means 13, 14 since the fixed bodies 23, 24 orient themselves at the stamping layer surface, e.g. when hydrophobic attraction is used to bind the hydrophobic part of a molecule. The substrate 20 needs not to have the attachment means 21. For instance a direct photochemical, chemical, thermal, mechanical, electrical, electrostatic, hydrostatic process or any combination of these processes may be exploited to fix the bodies to the substrate 20.

The proposed method is also suitable for any chemically nondefined body. For this the body simply needs to be combined with a chemically defined body which then acts as the receptor for a specific ligand provided through the orientation means 13, 14. After having attached this body complex at the stamping means 22 and touching the surface of the substrate 20 it is also possible that during or after the release of the stamping means 22 from the substrate 20 the chemically defined bodies are separated from the chemically non-defined bodies.

The number of different body types which are depositable with one single stamping means is not limited. Of course, also only one single body type may be deposited, e.g. by using only one type of orientation means.

The assistant fluid 25 may even perform better, when the free substituting materials 43, 44, 19 are added to it after the stamping means 22 together with the fixed bodies 23, 24 has been lowered onto the substrate 20. Since the attachment of the fixed bodies 23, 24 is more a statistical than a static process which means that these molecules tend to leave their fixed position from time to time and find their or another position again, a too early addition of the free substituting materials 43, 44, 19 could result in some defects.

A process arrangement is advantageous which uses the same fluid as container fluid 16 and as assistant fluid 26. The stamping means 22 may then be dipped into this fluid at the beginning of the process and remain there during the whole process. This helps avoiding dehydration and also creation of defects due to interfacial forces at the fluid-water interface. To add the various free bodies 33, 34, 18 or the free substituting materials 43, 44, 19 these may be brought in during the process, e.g. through a tube system which serves to bring the various free bodies 33, 34, 18 or the free substituting materials 43, 44, 19 in and transport them away. This may be combined with a moving fluid which even performs better since a higher homogeneity and mixture of the bodies in the fluid near the substrate 20 is achievable. The substrate 20 may also be arranged in the fluid already at the beginning of the process, e.g. when its surface is activatable by irradiation with light. After having introduced the free bodies 33, 34, 18 into the fluid, having washed them out of the basin 15 with more of the fluid, having touched the surface of the substrate 20 or the attachment means 21 on it and having introduced the free substituting materials 43, 44, 19 into the fluid, the deposition of the fixed bodies 23, 24 can be achieved by switching on light with the corresponding wavelength which shines through the transparent stamping means onto the surface of the substrate 20 or the attachment means 21 where it activates the chemical reaction to fix the fixed bodies 23, 24 to the substrate 20 or attachment means 21.

The control over the interfacial chemistry and the use of stamping to transfer an oriented protein, carbonic anhydrase (CA), to a solid surface by formation of a ligand-receptor complex with its aryl sulfonamide inhibitors is explained in the following example.

CA is part of a mammalian class of proteins that finds broad systemic distribution. These proteins, responsible for $CO_2$ fixation, have extremely high turnovers, are reasonably small, robust and generally only weakly charged at physiological pHs. CA may be implicated in the pathology of glaucoma and acidosis in humans. Human (HCA) and bovine CA (BCA) are readily and inexpensively obtainable from commercial sources and are well characterized at the sequence and structural level, with several high resolution X-Ray crystal structures available. The binding site of CA appears as a shallow depression on one face of the protein with a hydrophobic cleft approaching the specific zinc coordination site. CA is inhibited reversibly by benzylsulfonamides with association constants in the 106–109 range for its various derivatives, many of which find application as therapeutic drugs.

As orientation means 13, 14 an 11-aminoundecylbenzyl sulfonamide (r=11) is coupled to the surface of a patterned PDMS stamping means 12. Many such alkylbenzyl sulfonamide derivatives are known. The orientation means 13, 14 is to be brought onto the surface of the stamping means 22 in an oriented manner at a reasonably controlled density. The PDMS material is therefor activated by its oxidation to PDMS-$CO_2$H. Subsequent treatment of the activated surface with thionyl chloride to form an acid chloride ("overactivation"), or formation of an asymmetric anhydride using dicyclohexylcarbodiimide (DCC) each provide a convenient starting point for the attachment of the sulfonamide. Reaction of the w-amino portion of the alkylbenzyl sulfonamide, itself protected by a tert-butoxy or fluorenylmethoxy carbonyl (tBOC or FMOC respectively) allows a well defined attachment of the sulfonamide ligands to the PDMS with the sulfonamide ligands oriented towards the interface between the stamping means 22 and the solution containing the ligands in dissolved form. The attachment reactions are high yield-requiring conditions known not to affect siloxane based polymers; the side products of the reaction are soluble and thus easily removed. Removal of the protection group on the sulfonamide is carried out by exposure of the stamping means 22 to acid. HF may be used in this step with tBOC groups, but also use of FMOC groups is possible. Siloxanes are resistant enough to HF to allow their brief exposure to this acid.

Introduction of short poly(ethylene) glycols, ($CH_2CH_2O$—)$_n$ (PEG), 2 to 20 units long is a solution to the problem to hide the hydrophobic surface of the underlying PDMS sufficiently to prevent nonspecific deposition of the receptor. PEG linked directly to the alkyl sulfonamide in solution or attached heterogeneously to the surface of the PDMS may effectively avoid nonspecific adsorption to otherwise hydrophobic surfaces. PEG resists the formation of stable mixed phases with other materials. Its solvation structure and self-affinity produce a strong, entropically driven force of repulsion to materials that seek to incorporate in it. This tendency is particularly pronounced in their behavior with macromolecules like proteins or DNA: PEGs help partition these materials without causing their disruption.

When PEGs of only a few units are incorporated into thiol containing alkanes adsorbed on gold, deposition of proteins is completely blocked. When these PEGs are absent, in comparison, the presence of the alkane causes up to 10 nm of protein to deposit on the supported film by nonspecific, hydrophobic interactions with the alkyl backbone. A high effective concentration of ligands on the stamping means 22 is useful to prevent premature desorption of the receptor, here CA, from the stamping means 22 back into solution during its transfer to the substrate surface. The close spatial relationships between the ligands enhances the net binding of CA by reducing the entropic costs of normal ligand-receptor complex formation. Combined with a high initial ligand affinity, as in the case of sulfonamides and CA, the ligand provides a sufficient lifetime to the stamp-ligand-receptor complex to allow transfer in high yield of the substrate. Too high a concentration of ligand may be detrimental, however, if its density prevents access by the receptor to an individual ligand. Dilution of a ligand on the surface of the stamping means 22 with inert PEG spacers controls the distribution of ligands since the coupling reactions are largely statistical. Ideally, the PEG diluent is shorter than the PEG-ligand molecule to allow the ligand to appear in an unrestricted conformation above the stamp-solution interface.

Then follows the transfer and attachment of CA bound to the surface of the stamping means 22 to the substrate 20. Here the benzophenone groups are attached to an alkylthiol. This molecule self-assembles from its solution in ethanol onto the surface of gold. The reaction is specific and fast resulting is a well defined monolayer of the benzophenone groups. The stamping means 22 bearing CA is brought to the surface of the substrate 20 made of gold and covered with benzophenone (BP). Light-activation of the BP groups through the translucent stamping means 22 causes proximal attachment of CA to the surface of the substrate 20 in an aqueous buffer.

Several methods of releasing the stamping means 22 are possible. Mechanical stress may be sufficient to allow reversal of the sulfonamide-CA complex. Washing with a highly concentrated solution of free arylsulfoamides causes ligand replacement with eventual restoration of the CA to its unbound state by its equilibration against buffer free of ligand. Finally, thermal or buffer stresses (salt or pH) causes release as already known from affinity chromatography. Micromolding small capillaries into the surface of the stamping means 22 may be useful to facilitate mass transport of solution into areas targeted for release although simple delamination from the edges of the stamping means 22 may also prove sufficient.

The described method is generalizable to cases where other drug-protein complexes are known. Attachment of peptides to antibodies is also possible using this scheme of reactions so reminiscent of solid state peptide synthesis.

Where the orientation means needs to be added to the stamping means, a thin film, e.g. a gold film can be used as activating means and added to at least a part of the surface of the stamping means. This film then acts as a support for the covalent addition of a thiol-modified single strand of DNA as the orientation means. Shadow deposition of the activation means on a stamping means with a physical pattern, i.e. a pattern comprising protrusions and depressions is a way of enhancing the preciseness of the stamping process, since by the controlled deposition of the activation means the fixing of the bodies is restricted to selected portions of the surface of the stamping means. Here the shadow cast by deposition of metal at an oblique angle to the surface of the body allows the metal to deposit only on a predetermined small portion of the available surface of the stamping means and hence will allow the covalent addition of DNA only on these parts.

Where the bodies 23, 24 do not themselves show an anisotroy exploitable for orienting them at the surface of the stamping means, an intermediate means, e.g. a gold film can be added to at least a part of the surface of the bodies 23, 24. This film then acts as a support for the covalent addition of a thiol-modified single strand of DNA as the receptor. Shadow deposition of the film on the bodies 23, 24 is a way of introducing anisotropy to or enhancing an anisotropy of the bodies 23, 24, since by the controlled deposition of the film the DNA will only be linked to the surface which carries the film. Here the shadow cast by deposition of metal at an oblique angle to the surface of the body allows the metal to deposit only on a predetermined small portion of the available surface of the vodies 23, 24 and hence will allow the covalent addition of DNA only on these parts. Then linking duplexes can be used for achieving an ordered deposition of the bodies 23, 24.

What is claimed is:

1. A method of depositing one or more chemically defined bodies on a surface of a substrate said method comprising: a first step during which said bodies are fixed with a predetermined orientation on a surface of stamping means a second step during which said stamping means is approached to said surface of said substrate whereby said bodies are brought in contact with said surface of said substrate whereby said bodies become fixed on said substrate surface; and a third step during which said stamping means is moved away from said substrate whereby said bodies remain on said surface while keeping said predetermined orientation.

2. The method according to claim 1, wherein said fixing in said first step comprises providing the bodies within a container fluid and bringing into contact with the surface of the stamping means.

3. The method according to claim 1, wherein before the first step the surface of the stamping means is provided with a pattern which is used to define regions where the bodies shall be deposited in said second step on the surface of the substrate and regions where said bodies shall not be deposited on said surface of said substrate.

4. The method according to claim 1, wherein the surface of the substrate comprises material which is light-sensitive concerning its chemically attractive force and that the fixing the bodies to said surface of said substrate in said second step is assisted by irradiation with light.

5. The method according to claim 1 wherein the bodies are fixed to the surface of the substrate in said second step use of attachment means on said surface of said substrate which serves to attract said bodies and to fix them in said predetermined orientation.

6. The method according to claim 5, wherein the attachment means comprises material which is light-sensitive concerning its chemically attractive force and that the fixing of the bodies to the surface of the substrate in said second step via said attachment means is assisted by irradiation with light.

7. The method according to claim 1, wherein the stamping means comprises material which is light-sensitive concerning its chemically attractive force and that the fixing the bodies to said stamping means in said first step is assisted by irradiation with light.

8. The method according to claim 1, wherein the bodies are fixed to the surface of the stamping means in said first step by use of orientation means on said surface of said stamping means which orientation means serves to chemically attract said bodies and direct said bodies into the predetermined orientation.

9. The method according to claim 8, wherein the orientation means comprises material which is light-sensitive concerning its chemically attractive force and that the fixing of the bodies to the stamping means in said first step (22) via said orientation means is assisted by irradiation with light.

10. The method according to claim 8, wherein a mixture of different body types, differing in their chemical composition, is provided in said first step and that the orientation means comprises material which provides an attractive chemical force to a specific selection of said different body types.

11. The method according to claim 8, wherein the orientation means comprises simultaneously different materials for specifically attracting different specific selections of different body types.

12. The method according to claim 8, wherein the third step is assisted by an assistant fluid that contains material which constitutes at least part of the orientation means to facilitate keeping of said predetermined orientation during the movement of the stamping means away from the surface of the substrate.

13. The method according to claim 8, wherein the stamping means comprises an activated surface in order to effect there a self-assembly of the orientation means.

* * * * *